(12) United States Patent
Yufik

(10) Patent No.: US 9,563,843 B2
(45) Date of Patent: *Feb. 7, 2017

(54) SYSTEMS AND METHODS FOR A COMPUTER UNDERSTANDING OF MULTI MODAL DATA STREAMS

(71) Applicant: Yan M. Yufik, Potomac, MD (US)

(72) Inventor: Yan M. Yufik, Potomac, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,004

(22) Filed: May 5, 2016

(65) Prior Publication Data

US 2016/0247066 A1 Aug. 25, 2016

Related U.S. Application Data

(63) Continuation of application No. 13/762,230, filed on Feb. 7, 2013, now Pat. No. 9,378,455.

(Continued)

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |
| *G06N 3/08* | (2006.01) |
| *G06N 3/063* | (2006.01) |
| *G06K 9/62* | (2006.01) |
| *G06N 99/00* | (2010.01) |

(Continued)

(52) U.S. Cl.
CPC .............. *G06N 3/08* (2013.01); *G06N 3/063* (2013.01); *G06F 17/30707* (2013.01);

(Continued)

(58) Field of Classification Search
None
See application file for complete search history.

(56) References Cited

U.S. PATENT DOCUMENTS 4,144,564 A * 3/1979 Lamb ................. G06F 17/30982
5,586,219 A * 12/1996 Yufik ..................... G06N 3/0472
706/14

(Continued)

OTHER PUBLICATIONS

Associative memory properties of multiple cortical modules—1999 Alfonso Renart, Nestor Parga and Edmund T. Rolls.*

(Continued)

*Primary Examiner* — Kakali Chaki
*Assistant Examiner* — Ababacar Seck
(74) *Attorney, Agent, or Firm* — Whitham, Curtis & Cook, P.C.

(57) ABSTRACT

Systems and methods for understanding (imputing meaning to) multi modal data streams may be used in intelligent surveillance and allow a) real-time integration of streaming data from video, audio, infrared and other sensors; b) processing of the results of such integration to obtain understanding of the situation as it unfolds; c) assessing the level of threat inherent in the situation; and d) generating of warning advisories delivered to appropriate recipients as necessary for mitigating the threat. The system generates understanding of the system by creating and manipulating models of the situation as it unfolds. The creation and manipulation involve "neuronal packets" formed in mutually constraining associative networks of four basic types. The process is thermodynamically driven, striving to produce a minimal number of maximally stable models. Obtaining such models is experienced as grasping, or understanding the input stream (objects, their relations and the flow of changes).

15 Claims, 6 Drawing Sheets

Related U.S. Application Data

(60) Provisional application No. 61/688,199, filed on May 10, 2012, provisional application No. 61/688,200, filed on May 10, 2012.

(51) Int. Cl.
  *G06F 17/30* (2006.01)
  *G06N 3/04* (2006.01)

(52) U.S. Cl.
  CPC .............. *G06K 9/6269* (2013.01); *G06N 3/04* (2013.01); *G06N 99/005* (2013.01)

(56) References Cited

U.S. PATENT DOCUMENTS 5,588,091 A * 12/1996 Alkon ................... G06K 9/4628
   706/20

6,889,165 B2 * 5/2005 Lind ...................... G01D 21/02
   702/183

OTHER PUBLICATIONS

Final Technical Report Neural Network Computing Architectures of Coupled Associative Memories with Dynamic Attractors—1996 Morris W. Hirsch (PI) Bill Baird (Assist. Research Mathematician).*

Virtual Networks: New Framework for Operator Modeling and Interface Optimization in Complex Supervisory Control Systems—1996 Yah M. Yufd¢~ and Thomas B. Sheridan 2.*

Swiss Army Knife and Ockham's Razor: Modeling and Facilitating Operator's Comprehension in Complex Dynamic Tasks—2002 Yan M. Yufik, Senior Member, IEEE, and Thomas B. Sheridan, Life Fellow, IEEE.*

Using recurrent artificial neural network model to estimate voluntary elbow torque in dynamic situations—2005 R. Song K.Y. Tong.*

* cited by examiner

SYSTEMS AND METHODS FOR A COMPUTER UNDERSTANDING OF MULTI MODAL DATA STREAMS

BACKGROUND

Over the last several decades, a variety of techniques have been developed in Machine Intelligence and other disciplines dedicated to image understanding, but the level of understanding accomplished by such techniques has been limited.

SUMMARY

The level of understanding accomplished by Machine Intelligence and other disciplines dedicated to image understanding has previously been limited to identifying and recognizing individual objects in the image. By contrast, human understanding does not stop at recognizing objects but extends to hypothesizing relationships between objects and reconstructing the overall situation, as manifested in the image or sequences of images. Moreover, situational understanding is facilitated when visual information is combined with inputs in other sensory modalities. Understanding involves composition of mental models that enable predicting possible future changes in the situation as well as retrodicting earlier conditions from which the present situation could have developed. Systems and methods that emulate understanding mechanisms in the humans and allow reconstructing complex situations from multi modal data streams will find applications in intelligent monitoring, cyber warfare and other areas. Another class of applications involves dynamic structuring of information displays in human-machine systems for the purpose of facilitating operator understanding of complex dynamic situations and enabling robust decision making in real time.

Human cognition has evolved to optimize performance in fluid and complex environments. Unlike in a photograph or other fixed images, objects and conditions in the environment are not frozen in time but undergo continuous changes. As a result, understanding an image is not restricted to recognizing objects but involves mentally complementing the present fixed image with a series of other images reflecting conditions that are likely to precede and follow those in the image. That is, understanding is contingent on creating mental models capable of predicting future and retrodicting past conditions so that the present image can be seen as capturing some intermediate stage in an unfolding situation. When processing streaming data, such models are created and adjusted dynamically, based on the degree of mismatch between the predicted and actual conditions.

According to the present disclosure, understanding a situation involves reducing combinations of objects and conditions into a two-partite or three-partite model expressing, accordingly, two or three components and a relationship between them, such as "John loves Mary," "USA supplies troops to coalition forces", "bottle contains milk," "in this chess position, whites are threatening blacks in the center," "target A deploys weapon B to attack asset C," etc. Models can be nested, that is, any component in a model can be a composition of other models. Components are defined by spatial characteristics (e.g., size, location), temporal characteristics (e.g., the time of appearance) and features (color, texture, amount, etc.). Relationships are defined by the manner in which the behavior of one component (sequence of events, or pattern, involving changes in the component's features and spatial characteristics over time) constrains behavior of the other component. For example, the relationship "love" defines a pattern such that co-location of the components in the past entails their likely co-location over extended time intervals in the future, the relationship "attack" defines a pattern where an object with features and spatial characteristics of a weapon enters the vicinity of an asset, etc.

In situational models, one component remains an invariant part of the relationship persisting throughout the situation or several situations while the other components are subject to variation. For example, in "bottle contains milk" the component "bottle" can be considered invariant while the contents are allowed to vary. Varying the amount of milk can be considered continuing the on-going situation while replacing milk with, say, water defines the onset of a new one. In a similar way, in "John loves Mary," John seeks co-location with another person, an instance of that relationship (a situation) continues for as long as that person remains to be Mary and until either Mary is replaced or the behavior ceases. Relationships can be inverted, for example, the inverse of "containment" is "to be contained." In that inverse, "milk" can be the invariant part while the container is allowed to vary (milk is transferred from bottle A to bottle B). In "being loved," Mary can be the invariant component engendering seeking behavior in varying parties.

A computer based system capable of constructing situational models receives input from different sensors and utilizes several types of artificial neurons for input processing, as follows: sensory neurons (pixels) respond to different elements (features) in the incoming streams, temporal neurons respond to various temporal relations in the activation of sensory neurons (e.g., activation of neuron A preceded activation of neuron B), spatial neurons respond to different locations and relative positions of activation sources (e.g., neuron A was activated by sensor located in X), complex neurons respond to various activation patterns involving sensory, temporal and spatial neurons, hypercomplex neurons respond to various compositions of activation patterns involving complex neurons, and semantic neurons respond to various patterns of activation involving hypercomplex neurons and associate such patterns with labels in a finite set of labels signifying meaningful relationships ("love," "threat", etc). For example, semantic neuron "containment" can be defined by a pattern including two objects appearing separately, followed by placing one object inside the volume occupied by the other object, followed by separating the objects (and/or other alternatives). Each such object can be defined by feature constellations, spatio-temporal characteristics and behavior patterns specified in hypercomplex and complex neurons. All neurons respond probabilistically, that is, their activation by the corresponding pattern can be less than 100% certain. Sets of features activating different sensory neurons (neuron's sensitivity range) can partially overlap. In the same way, patterns activating different complex and hypercomplex neurons can partially overlap.

Input processing for situational understanding involves two interrelated stages: I) identifying (recognizing) objects and conditions and II) constructing a two- or three-partite model hypothesizing an overall relationship between the objects and conditions and thus determining the situation as the situation unfolds.

Stage I constructs an associative network where nodes are sensory neurons and links between the nodes are weighted by the relative frequency of neuron's co-activation (each time neurons $N_1$ and $N_2$ are both activated within some time window, the weight of the link connecting $N_1$ and $N_2$ is incremented. Alternatively, absence of co-activation causes the weights to decay). Next, the network is partitioned into maximally internally cohesive (maximum summary weight of the internal links) and minimally externally coupled subnetworks (minimal summary weight of the external links connecting the subnetwork to other such subnetworks). For each subnetwork, boundary energy barrier is computed as a function of the ratio of the sum of the internal to the sum of the external weights in that subnetwork. Subnetworks surrounded by energy barriers at their boundaries are called "neuronal packets." Packets behave as units: activation of any neuron in a packet produces activation in the rest of the packet. Activation patterns causing responses in complex neurons are paths in the network of sensory packets. Similarly, activation patterns causing responses in hypercomplex neurons are paths in the network of complex neurons. Due to interplay between activation and decay, link weights in all the networks are continuously updated entailing periodic re-partitioning in the networks and re-shaping of the packets. The barriers play a pivotal role in such re-partitioning, as follows.

Removing a neuron from a packet requires energy expenditure (incurs energy cost) while absorbing a neuron into a packet returns energy into the network with both expenditures and returns being determined by the height of the barrier and the relative strength (the sum of link weights) with which the neuron crossing the barrier is attached to other neurons. When neurons are absorbed, some fixed percentage of released energy is lost as a result of dissipation. Each partitioning cycle receives fixed energy budget and seeks the best partitioning (minimizing the total external link weight to the total internal link weight ratio across the network) obtainable within that budget (the sum of expenditures and dissipative losses remains within the budget). As a result, in each re-partitioning cycle packets surrounded by higher barriers tend to undergo marginal modifications (shedding weakly attached neurons) while those surrounded by lower barriers can dissolve and their constituent neurons can be absorbed into the surrounding packets. In this way, energy barriers determine the relative packet stability.

Stable packets of sensory neurons define persistent feature constellations characteristic of particular objects thus allowing "object recognition". Inclusion of spatial neurons in a packet can define a particular location, or spatial tag (object A in location X), inclusion of a temporal neuron can define a particular time interval, or temporal tag (object A at time $T_1$). Complex neurons can be defined that respond to packets with spatial and temporal tags and assert the object's identity (object located at $X_1$ at time $T_1$ and at $X_2$ at time $T_2$ is the same object, object A).

Complex and hypercomplex neurons organize into associative networks partitioned into packets, in the same way as sensory neurons organize into a network partitioned into packets. Stable packets of complex and/or hypercomplex neurons define repetitively co-occurring combinations of patterns.

In the networks of sensory, complex and hypercomplex neurons, link weights are modified only when neurons connected by the link get co-activated, or as a result of decay in the absence of co-activation. Combining neurons into packets, removing neurons from and/or absorbing neurons into packets entails no weight modification.

Activation patterns associated with complex, hypercomplex and semantic neurons are initially defined by the system user. However, when stable packets of sensory neurons emerge, new complex neurons can be generated responding to various patterns of packet activation different from those envisioned by the user. In time, co-activated complex neurons get associated into link-weighted networks that are subsequently partitioned into packets, in the same way as the networks of sensory neurons are partitioned into packets. Similarly, new hypercomplex neurons can be generated responding to activation patterns involving packets of complex neurons.

Stage II uses packets produced at stage I to construct situation models. Models are formed of groups of packets of hypercomplex neurons, model construction involves shifting neurons between packets, adjusting responses of individual neurons (inhibiting responses to some complex neurons and amplifying responses to other complex neurons within the hypercomplex neuron's sensitivity range), and combining packets into groups, until a two- or three-partite configuration is constructed (situational model) that is a) comprised of two or three groups of hypercomplex neurons and b) causes activation of at least one semantic neuron. Groups in the model are not restricted to paths in a network of hypercomplex packets but can include any combination of such packets (for example, a group formed on path A-B-C can include packets A and B but not C). In this way, a model can hypothesize a relationship between objects and/or events that are separated by arbitrary time intervals and any number of intervening objects and/or events. Groups are not packets, that is, no energy barriers are formed at their boundaries. Accordingly, adding to or removing packets from groups incurs no energy costs.

Models are validated by comparing predicted events to those actually taking place in the course of time. For example, model "target A deploys weapon B to attack asset C" predicts movement of B in the direction of C. Disconfirming the model (no such movement is observed) entails re-construction which can involve deselecting packets, selecting new ones and their subsequent adjustment. Repetitive prediction failures cause iterative re-grouping and adjustment of packets in hypercomplex, complex and sensory networks. Similar to processes in stage I, each modeling cycle receives a limited energy budget for packet adjustments and seeks to find the most efficient adjustments. Efficient adjustments reduce the amount and expense of subsequent adjustments, the efficiency is maximized when models can be formed by grouping packets, with minimal or no packet adjustments.

In probabilistic networks partitioned into packets, network entropy can be computed as a function of the ratio of the total weight of inter packet links to the total weight of all the packets in the network. Seeking partitions that minimize the ratio equates to entropy reduction, or negentropy production. The overall method for processing multi modal data streams can be defined as iterative entropy reduction in a system of networks, with each iteration cycle investing limited energy budgets into entropy reducing operations in the network.

Accordingly, described below are non-limiting example embodiments of various aspects of systems and methods for processing multi modal data streams.

A computer implemented method in a self-adaptive multi modal data stream processing system having at least one computer processor and at least one spatiotemporal associative memory coupled to the at least one computer processor may be summarized as including constructing, by a construction module under control of a control module of the multi modal data stream processing system, a model of a situation built upon an underlying associative neural network stored in the associative memory to establish situational understanding of the situation, wherein the model is comprised of invariant and variable entities and relationships between the entities, wherein each entity is able to be nested by the control module by being comprised of lower level models and wherein the lower level models are formed of packets and are groups of packets; manipulating the lower level models by the control module of the multi modal data stream processing system, leaving the underlying associative neural network intact by not changing synaptic weights in the underlying associative neural network in the manipulation of the lower level models; and reducing, by the multi modal data stream processing system, energy consumption and energy dissipation in the constructing and the manipulating of the models by the control module seeking progressively more general and adequate models persisting through various situations and wherein the reducing energy consumption and dissipation translates into negentropy production.

Manipulating the lower level models may include grouping the packets; adjusting the packets, including adding or removing artificial neurons of the underlying associative neural network in the associative memory; and varying packet responses of the packets, including rotating a vector of neuronal responses inside the packets.

A computer-implemented method in a self-adaptive multi modal data stream processing system having at least one computer processor and at least one spatiotemporal associative memory coupled to the at least one computer processor may be summarized as including constructing, by a control module of the multi modal data stream processing system, at least one three-partite situation model of a situation represented by a plurality of different data streams, by making associations of artificial neurons of a plurality of artificial neurons of various different types in an artificial neural network in the spatiotemporal associative memory, wherein the constructing of the at least one three-partite situation model includes: developing, by a control module of the multi modal data stream processing system, link-weighted associative artificial neural networks in the spatiotemporal associative memory, wherein the developing the link-weighted associative artificial neural networks includes: corresponding, by the multi modal data stream processing system, individual nodes of the link-weighted associative artificial neural networks to respective artificial neurons of the plurality of artificial neurons that respond to different data elements of data representing the plurality of different data streams; and establishing link weights of the link-weighted associative artificial neural networks which represent a frequency of co-occurrence of the different data elements of the data representing the plurality of different data streams; dynamically partitioning as the situation unfolds over time, by the control module of the multi modal data stream processing system, the link-weighted associative artificial neural networks into internally cohesive subnetworks and externally weakly coupled subnetworks, wherein the subnetworks are packets, each corresponding to at least a respective one of various different combinations of the data elements; performing dynamic mapping, by the control module of the multi modal data stream processing system, between the packets as the situation unfolds over time to adjust the at least one three-partite situation model to improve the at least one three-partite situation model for use in understanding of the situation, wherein the partitioning and dynamic mapping leave the artificial neural network intact by not changing synaptic weights in the artificial neural network in the partitioning and the dynamic mapping; based on the at least one three-partite situation model, generating, by the multi modal data stream processing system, situational understanding of the situation; and reducing, by the multi modal data stream processing system, energy consumption and dissipation in the constructing, partitioning and dynamically mapping by the control module seeking progressively more general and adequate models persisting through various situations and wherein the reducing energy consumption and dissipation translates into negentropy production.

Performing dynamic mapping between the packets as the situation unfolds over time may include associating, by the multi modal data stream processing system, the packets into distinct packet groupings representing situational entities of the situation; associating, by the multi modal data stream processing system, the packet groupings into invariant situational components of the situation; associating, by the multi modal data stream processing system, packet groupings into variable situational components of the situation; assigning, by the multi modal data stream processing system, a relationship type to each respective situational component of the invariant situational components and to each respective situational component of the variable situational components based on contents of and behavior of the respective situational component to construct the at least one three-partite situation model; manipulating the at least one three-partite situation model; comparing results of the manipulation with relevant data of the integrated data stream to facilitate determining validity of the at least one three-partite situation model; and adjusting the at least one three-partite situation model based on the comparing.

The method may further include receiving, by the multi modal data stream processing system, the plurality of different data streams, each of the different data streams originating from different sensors; and in response to the receiving the plurality of different data streams, automatically integrating, by the multi modal data stream processing system, the plurality of data streams in real time to produce an integrated data stream; and based on the generated situational understanding, the multi modal data stream processing system generating warning advisories for delivery to relevant selected recipients to mitigate a threat posed by the situation. Constructing the at least one three-partite situation model of a situation represented by the plurality of different data streams may occur in response to the integrating the plurality of data streams in real time to produce an integrated data stream. Performing the dynamic mapping between the packets as the situation unfolds over time may include automatically assessing, by the multi modal data stream processing system, a level of a threat existing in the situation as the situation unfolds over time.

Assessing the level of a threat existing in the situation as the situation unfolds over time may include predicting, by the multi modal data stream processing system, changes in the situation using the at least one three-partite situation model; and determining, by the multi modal data stream processing system, adequate responses. At least some of the different data elements may represent pixels. The frequency of the co-occurrence of the different data elements of the data representing the plurality of different data streams may be correlated to an associative strength between the artificial neurons of the plurality of artificial neurons of various different types. The plurality of artificial neurons of various different types may include a combination of: sensory neurons, temporal neurons, feature neurons, spatial neurons, hyper complex neurons, semantic neurons, and control neurons. The link weights of the link-weighted associative artificial neural networks may reflect co-occurrence of state changes in the plurality of artificial neurons of various different types. Performing dynamic mapping between the packets as the situation unfolds over time may include computing, by the multi modal data stream processing system, response strength of each respective artificial neuron of at least some of the artificial neurons of the plurality of artificial neurons as a function of activation probabilities of artificial neurons connected to the respective artificial neuron. Performing the dynamic mapping between the packets as the situation unfolds over time may include inserting or removing links or nodes in the link-weighted associative artificial neural networks. Performing the dynamic mapping between the packets as the situation unfolds over time may include adjusting the link weights of the link-weighted associative artificial neural networks. Performing the dynamic mapping between the packets as the situation unfolds over time may include expanding or shrinking the packets. Performing the dynamic mapping between the packets as the situation unfolds over time may cause improvement in predictive or retrodictive performance of the three-partite situation model for use in threat level assessment of the situation.

A multi modal data stream processing system may be summarized as including at least one computer processor; at least one non-transitory spatiotemporal associative memory coupled to the at least one computer processor; and at least one non-transitory memory communicatively coupled to the computer processor having computer-executable instructions stored thereon that, when executed by the computer processor, cause the computer processor to: dynamically partition, as a situation represented by a plurality of different data streams unfolds over time, link-weighted associative artificial neural networks into internally cohesive subnetworks and externally weakly coupled subnetworks, wherein the subnetworks are packets, each corresponding to at least a respective one of various different combinations of data elements of data representing the plurality of different data streams; perform dynamic mapping between the packets as the situation unfolds over time to adjust at least one three-partite situation model to improve the at least one three-partite situation model for use in understanding of the situation by the system, wherein the partitioning and dynamic mapping leave the artificial neural network intact by not changing synaptic weights in the artificial neural network in the partitioning and the dynamic mapping; generate situational understanding of the situation based on the at least one three-partite situation model; and reduce energy consumption and dissipation in the partitioning and the dynamically mapping by seeking progressively more general and adequate models persisting through various situations wherein the reducing energy consumption and dissipation translates into negentropy production.

The computer-executable instructions that may cause the computer processor to automatically assess the level of threat existing in the situation as the situation unfolds over time based on the at least one three-partite situation model, may include computer-executable instructions that, when executed, may cause the computer processor to, based on the generated situational understanding, automatically assess a level of a threat existing in the situation as the situation unfolds over time based on the; based on the assessed level of threat, generate warning advisories for delivery to relevant selected recipients to mitigate a threat posed by the situation; facilitate timely automatic detection and evaluation of malware in a computer network, wherein various features of the computer network are represented by the link-weighted associative artificial neural networks; and dynamically improve deployment of countermeasures against the malware over time. The computer-executable instructions that may cause the computer processor to facilitate timely automatic detection and evaluation of malware, may include computer-executable instructions that, when executed, may cause the computer processor to identify correlations between elements of the malware, geospatial locations within the computer network and temporal organization of attack patterns of the malware revealed by the dynamic partition of the link-weighted associative artificial neural networks into internally cohesive subnetworks and externally weakly coupled subnetworks.

A non-transitory computer readable storage medium, having computer-executable instructions stored thereon that when executed by a computer processor may cause the computer processor to construct, by a control module of the multi modal data stream processing system, at least one three-partite situation model of a situation represented by a plurality of different data streams, by making associations of artificial neurons of a plurality of artificial neurons of various different types in an artificial neural network in a spatiotemporal associative memory; dynamically partition, as the situation unfolds over time, by a control module of the multi modal data stream processing system, link-weighted associative artificial neural networks of the artificial neural network into packets, each corresponding to at least a respective one of various different combinations of data elements of data representing the plurality of different data streams; perform dynamic mapping, by a control module of the multi modal data stream processing system, between the packets as the situation unfolds over time to adjust the at least one three-partite situation model to improve the at least one three-partite situation model for use in understanding of the situation, wherein the constructing, dynamically partitioning and dynamic mapping leave the artificial neural network intact by not changing synaptic weights in the artificial neural network in the constructing, partitioning and the dynamic mapping; generate situational understanding of the situation as the situation unfolds over time based on the at least one three-partite situation model; and reduce energy consumption and dissipation in the constructing, dynamically partitioning and dynamically mapping by seeking progressively more general and adequate models persisting through various situations wherein the reducing energy consumption and dissipation translates into negentropy production. The computer computer-executable instructions, when executed by the computer processor, may further cause the computer processor to automatically assess a level of a threat existing in the situation as the situation unfolds over time based on the situational understanding facilitate automated intelligent surveillance of the situation. Automatically assessing a level of a threat may include identification of objects or conditions in the situation that constitute the threat when acting in coordination. Automatically assessing a level of a threat existing in the situation may facilitate a robotic vehicle or other robotic system automatically responding to an environment of the robotic vehicle or other robotic system to perform one or more of: pursuing specified objectives and responding to obstacles.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
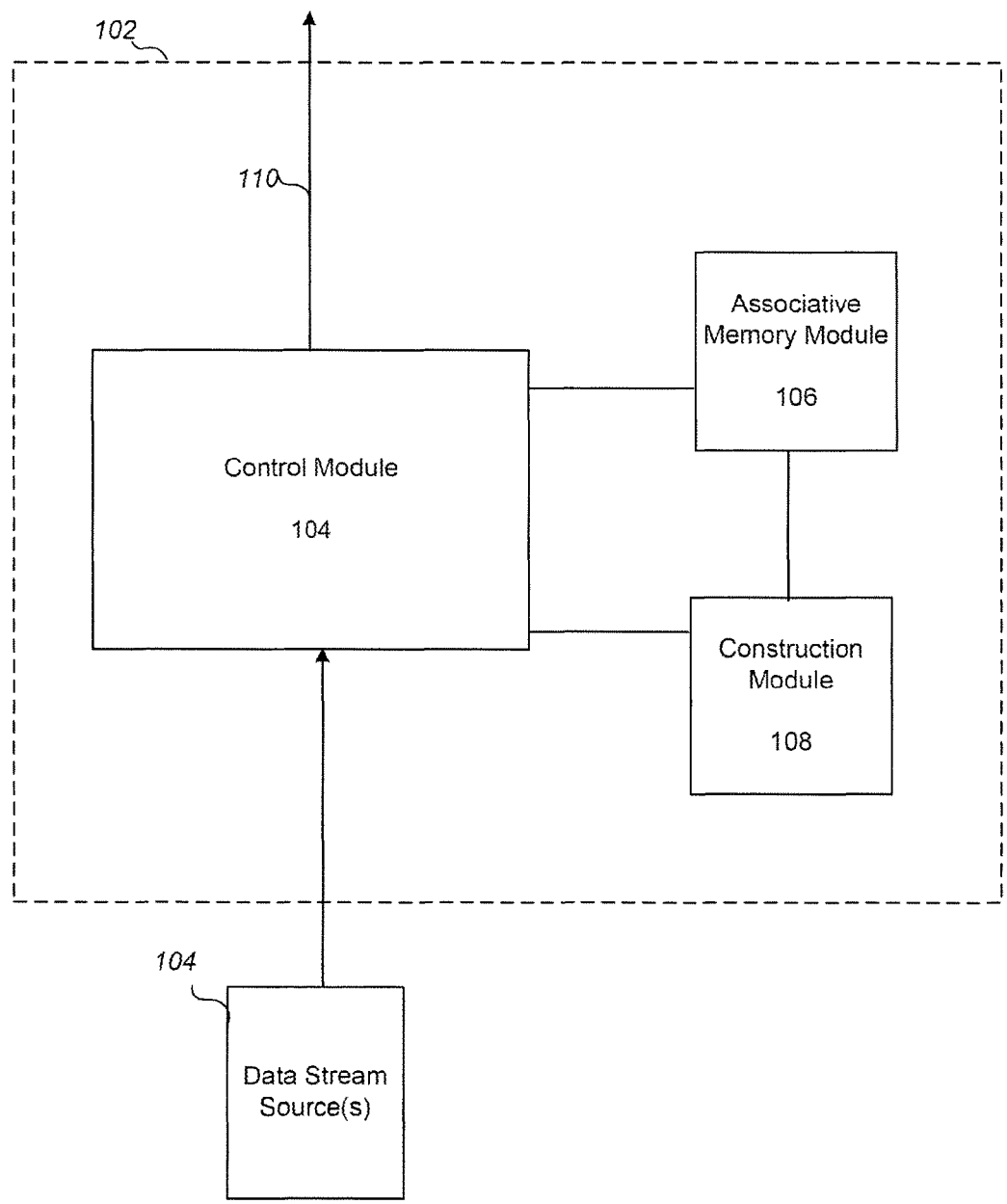
FIG. 1 is a block diagram of a self-adaptive multi modal data stream processing system, according to one illustrated embodiment.

FIG. 1 is a block diagram of a self-adaptive multi modal data stream processing system 102, according to one illustrated embodiment.

The self-adaptive multi modal data stream processing system 102 is configured to understand (impute meaning to) multi modal data streams such as those originating from data stream source(s) 104. In one embodiment, the self-adaptive multi modal data stream processing system 102 is used in intelligent surveillance and allows a) real-time integration of streaming data from video, audio, infrared and other sensors, b) processing the results of such integration to obtain understanding of the situation as it unfolds, c) assessing the level of threat inherent in the situation, and d) generating warning advisories delivered to appropriate recipients as necessary for mitigating the threat. Such situational understanding for the purposes of threat assessment can allow identification of objects and conditions that appear innocuous when considered independently from each other but might constitute a threat when acting in coordination.

In another embodiment, the self-adaptive multi modal data stream processing system 102 is used to obtain a high degree of autonomy in robotic vehicles or other robotic systems, endowing such systems with the capability to pursue user-specified objectives and efficiently respond to obstacles unknown to the user as well as other unforeseeable eventualities.

A computer-implemented process in the self-adaptive multi modal data stream processing system 102 for understanding streaming data involves constructing three-partite situation models capturing 1) invariant and 2) variable components of the situation and establishing 3) a meaningful relationship between the components. Operations on such models allow predicting changes in the situation and composing adequate responses. For example, a situation model can include high value target(s) under protection as the invariable component A and the means of attack as the variable component B. Meaning is defined by the relationship "A THREATENS B" which can be established when conditions exist allowing the means to reach the targets, with the variety of such conditions and attack scenarios revealed by the simulation.

Situational models are constructed as associations of "neurons" of various types, employing a process that emulates mechanisms in the human brain underlying understanding (mental modeling). In one embodiment, such construction involves 1) development of link-weighted associative networks such that nodes correspond to neurons responding to different data elements (e.g., pixels) and link weights represent the frequency of such elements co-occurrence in the data stream (associative strength), 2) dynamic partitioning of such networks into internally cohesive and externally weakly coupled subnetworks (packets) corresponding to various combinations of data elements and 3) conducting dynamic mapping between the packet networks which results in a) associating packets into distinct groupings representing situational entities, b) associating packet groupings into stable (invariant) and changing (variable) situational components, c) assigning a relationship type to the components based on their contents and behavior (creating a model), d) manipulating the model and comparing results with the data to determine the model's validity (simulation) and e) adjusting the model based on the simulation's outcome. Packet manipulation leaves the underlying associative network intact. That is, an input stream modifies synaptic weights while packet manipulation does not. All animals are capable of pattern detection, to a varying degree (this is called "conditioning") while mental modeling is unique to the humans. Modeling by the system 102 enables construction of higher order regularities, or invariants (laws of nature) while associations alone including, multiple other methods in the class of "neural networks" can only detect transient "regularities." Modeling (packet manipulation) by the system 102 builds on the foundation of associative networks but is by no means reducible to it.

For example, relationship "THREAT" can be assigned to components A and B when component A is determined to be moving towards component B, the model predicts continuing movement until A enters the vicinity of B and gets adjusted when the approach is terminated followed by component A moving away from component B. The architecture of the system 102 as shown in FIG. 1 includes a plurality of modules including an Associative Memory Module 106 comprised of "artificial neurons" and responsible for organizing the said neurons into networks, a Construction Module 108 responsible for partitioning such networks into packets and associating the said packets into groups (situational entities) and groups of groups (situational components) and Control Module 104 responsible for assigning relationship to the situational components and manipulating the said components in a manner determined by the assigned relationship and used to validate the model by predicting the future and retrodicting the past data elements in the data stream and assessing the degree of fit between the model-generated and the actual data.

In one embodiment, the self-adaptive multi modal data stream processing system 102 imputes meaning to data streams (creates situational understanding by the self-adaptive multi modal data stream processing system 102), by constructing models of entities and conditions likely to exist at the source of the streaming data (situation models). The self-adaptive multi modal data stream processing system 102 emulates neuronal mechanisms in the human brain responsible for creating and exercising models of the environment (mental models). The Control Module 104 establishes a system of "artificial neurons" and associates data elements and various combinations of data elements with such neurons according to actions which include but are not limited to, partitioning stream history into equal length time intervals (episodes) and establishing neurons of various types. Different types of neurons respond to: A) sensory features in the input (color (optical wave length), sound (acoustic wave length), etc.), B) spatial features (location of the source of sensory inputs), C) temporal features (precedence, order of the sensory inputs) and D) combinatorial features, i.e., various combinations of the A, B and C feature types.

A, B, C, and D form separate but interacting self-partitioning networks. Interaction involves mutually constraining mappings between packets in the networks, resulting in (experienced as) construction (detection) of "objects" in the environment (input stream). "Object" is a cohesive group of sensory features (sensory packet) that keeps co-occurring (temporal packet) in contiguous locations (spatial packet).

Combinatorial, or semantic neurons capture relations between "objects" (packet groupings). There are only four underlying relations between packet groupings: group X is separate from group Y, X partially overlaps with Y, X is identical (completely overlaps) with Y, X is a part of Y. There are only two basic forms of relations between objects: "object X relates to object Y" and "object X relates to object Y via Z." The latter relation corresponds to extracting the common component Z (invariant) from overlapping X and Y (variables). There are all kinds of semantic relations between objects (John loves Mary, box rests on the table, rains cause floods, . . . ) are expressed as (boil down to) combinations of A, B, C groupings in one of the two basic forms (e.g., "X might be the cause of Y if Y is always preceded by X and X is always followed by Y, etc.). Combinations can be expressed as chains (sequences) or matrices (sequences of sequences, nested sequences) of groupings.

For example, the types of neurons include: a) sensory neurons respond probabilistically to various data elements (e.g., pixels and pixel states), b) temporal neurons which respond probabilistically to temporal relations between the data elements (e.g., state change of pixel A precedes, coincides or follows state change of pixel B), c) feature neurons which respond probabilistically selectively to state changes of sensory neurons and associate such changes with various situational primitives in (features of) the data source (e.g., state change in sensory neuron A indicates the presence of color "red" in the source, state change in sensory neuron B indicates the presence of an edge-like shape in the source), d) spatial neurons which respond probabilistically to state changes in the feature and temporal neurons and associate such changes with spatial relations between situational primitives at the source (e.g., object A is adjacent to object B, object C is located on top of object D, etc.), e) complex neurons which respond probabilistically to various combinations of state changes in the feature, temporal and spatial neurons and associate such changes with persistent combinations (entities) and spatio-temporal relations between such entities at the source, f) hyper complex neurons which respond probabilistically to various combinations of state changes in complex neurons and associate such changes with persistent entity groupings and condition combinations at the source, g) semantic neurons which respond probabilistically to various combinations of state changes in complex and hyper complex neurons and associate such changes with meaningful relations (semantic links) between entity groupings and condition combinations definitive of the overall situation (e.g., group A threatens group B, group A supports group B, etc.), g) control neurons which respond to inputs arriving from the Control Module and act to inhibit or activate other neurons, and h) other types of neurons.

The construction module 108, under control of the control module 104, constructs link weighted networks comprised of neurons of various types (temporal network, feature network, spatial network) such that neurons form nodes in the network, links reflect co-occurrence of state changes in the neurons (e.g., from active to dormant) and link weights are determined by the relative frequency of such co-occurrences. The control module 104 dynamically partitions such networks stored in the associative memory module 106 into maximally internally cohesive and externally minimally coupled subnets (packets). The control module 104 conducts dynamic mapping between the networks in order to obtain packet groupings across the networks and associates such packet groupings with distinct situational entities with unique identity manifested in the history of the data stream (e.g., entity A in episode X and entity B in episode Y are one and the same entity). For the purposes of such mapping, response strength of neuron X is computed as a function of activation probabilities of the neurons connected to (mapped to) neuron X.

The construction module 108, under control of the control module 104, constructs (possibly, nested) components of situation models, by grouping situational entities into persistent (invariant) and changing (variable) entity groupings (groups of groups of packets). The control module 104 imputes meaning to the situation by connecting components to one of the semantic neurons and thus establishing a semantic link between the constituents of the situation and applies global organizational criteria, such as relative complexity, negentropy increment, or other criteria in order to increase performance of the process and the result of model construction.

The control module also assesses the model's performance by varying model parameters and assessing the degree of fit between the model's output and the present data, as well as the historic data in the data stream. Then the control module 104 adjusts the model by inserting and/or removing links and/or nodes in the networks, adjusting link weights, expanding and/or shrinking packets, in order to improve the model's predictive and retrodictive performance and thus achieve a higher degree of situation understanding.

The dynamic mapping involves connecting each such packet grouping to a particular complex neuron or a particular group of complex neurons responding strongly to combinations of state changes in the neurons inside the constituent packets in the packet groupings. Constructing the components of the situation models involves connecting groups of entities to a particular hyper complex neuron or particular groups of hyper complex neurons responding strongly to combinations of state changes in the entities inside the constituent entity groupings. The system imputing meaning to the situation involves selecting semantic neurons responding strongly to the combination of temporal and spatial relations between and feature compositions inside those components.

The Associative Memory Module 106 is comprised of different types of neurons and is responsible for a) organizing such neurons into link-weighted networks, and b) partitioning such networks into packets. The Construction Module 108 is responsible for a) conducting dynamic mapping between the packet networks, b) constructing (possibly, nested) situation models, and c) exercising the models, by varying their parameters, to obtain predictions and retrodictions of data in the data stream. The Control Module 104 is responsible for a) applying global criteria to optimize construction of situation models, b) assessing model's performance, and c) applying adjustments to the model to achieve performance improvements. The Control Module 104 may also output data 110 regarding the system's understanding and assessment of the situation as it unfolds over time based on the situation models generated by the system 102.

According to one embodiment, dynamic mapping between packet networks in the Construction Module 108 involves internetwork, intranetwork, global and semantic operations, as follows:

A) Internetwork operations determine pair wise relations between packets and/or packet groupings within a network:
 1. Packet A is separate from packet B; or
 2. Packet A overlaps packet B.

B) Intranetwork operations determine pair wise relations between packets and/or packet groupings in different networks:
 1) Packet A in network X connects to packet B in network Y; or
 2) Packet A in network X does not connect to packet B network Y.

The inter- and intranetwork operations establish distinct and unique entities and associate such entities with particular locations, episodes and characteristics (features) manifested in the course of such episodes (e.g., entity A appeared in episode N at location X and manifested feature combination f1, f2, . . . , fn).

C) Global operations determine global pair wise relations between entities, including:
 1. Entity A is identical to entity B.
 2. Entity A is a part of entity B.
 3. Entity A conditions entity B (causes, enables, triggers, etc.).
 4. Entity A can co-occur (is compatible) with entity B.

D) Semantic operations involve grouping entities into situational components and establishing semantic relations between the components.

Adjustment operations in the Control Module engage control neurons and involve inhibiting/activating individual neurons, changing response characteristics (probabilities) of individual neurons, redistributing neurons between packets, and re-distributing packets between entities.

Both self-partitioning into packets and packet manipulations in the system 102 are configured to strive for thermodynamic optimization, that is, the entire system 102 strives to minimize internal energy consumption. Manipulating packets is work—it requires energy and minimizing energy consumption enforces constructing "durable," stable models (that is, capturing persistent regularities, invariants in the environment). Human understanding is ultimately an expression of the basic thermodynamic laws albeit in a unique fashion. Thus, construction of the model at each step strives to minimize entropy in the network system (maximize negentropy increments) leading to progressively reducing the amount of adjustments while improving the degree of fit between the model's output and the data. The construction of the model by the construction module 108 reduces the number of unique entities and narrows the range of their behavior variation throughout different episodes and situations in the unfolding history of the situation.

In accordance with an aspect of the disclosure, the systems and/or components shown in FIG. 1 may contain discrete functional program modules that might make use of an application programming interface (API), or other object, software, firmware and/or hardware, to request or provide services of one or more of the other systems or components within the self-adaptive multi modal data stream processing system 102 and/or running on the same machine. For example, communication can be provided over a communications medium between any one of the systems or components shown in FIG. 1.

Figure 2:
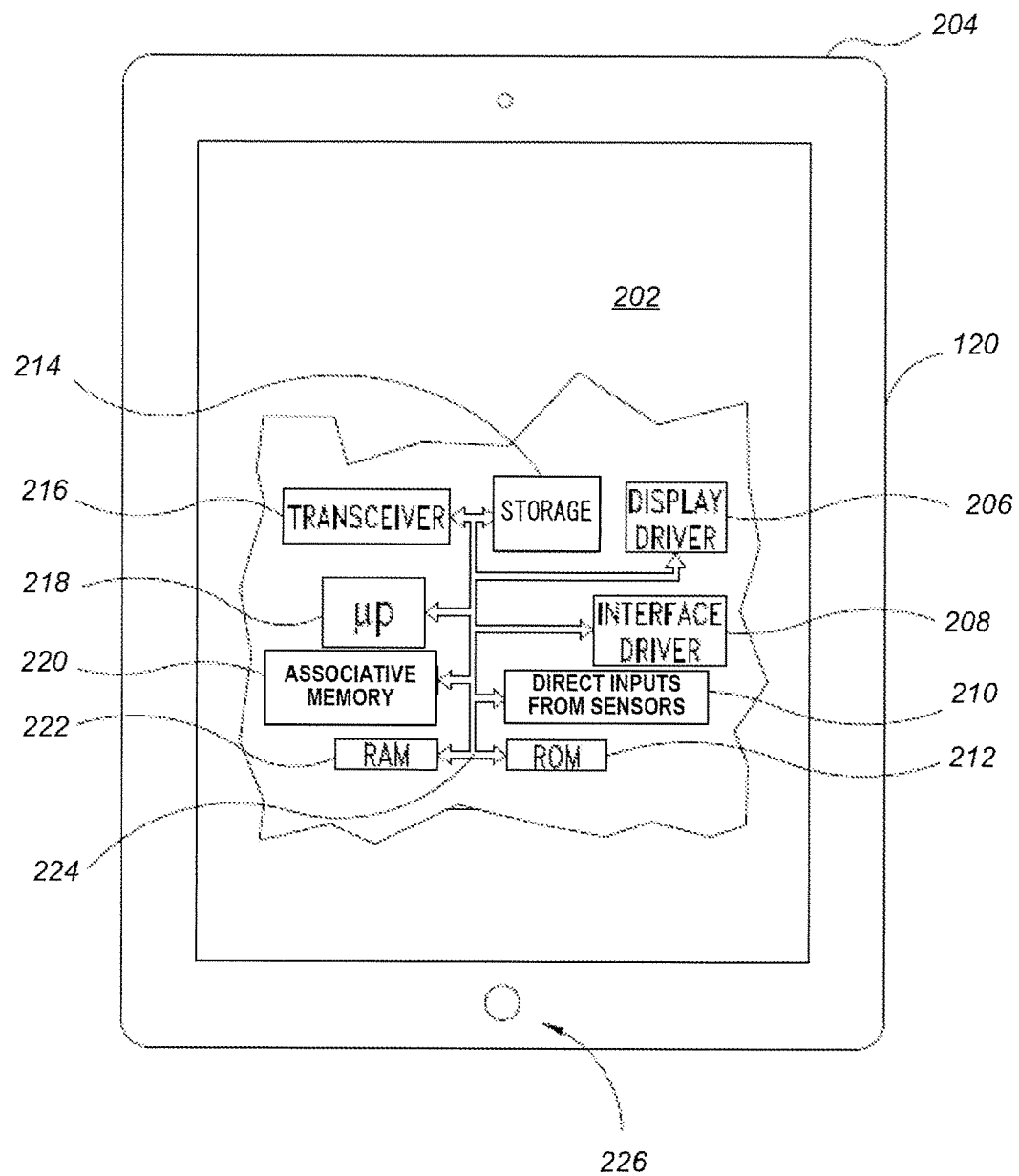
FIG. 2 is a functional block diagram of a computing device suitable for implementing the self-adaptive multi modal data stream processing system of FIG. 1, according to one illustrated embodiment.

FIG. 2 shows an example computing device 120 suitable for implementing the self-adaptive multi modal data stream processing system 102 and executing any one or more of the modules of FIG. 1, according to one illustrated embodiment. For example, the computing device 120 is a computing device 120 executing operations and performing functions of the control module 104, associative memory module 106 and/or the construction module 108.

In one embodiment, the computing device of FIG. 2 is a wireless computing device (e.g., a wireless tablet device). In other example embodiments, the computing device 120 may take the form of one or more of the following: a desktop computer, personal digital assistant (PDA), handheld personal computer, appropriately configured cellular telephone or smart phone, other handheld communications device, personal computer (PC), distributed computing devices, a server computer, etc. The computing device 120 may also include a transmitter and receiver, or transceiver 216 under the control of the processor 218, and be coupled to one or more external or internal antennas (not shown) to wirelessly transmit and/or receive information, such as to receive multi modal data streams and output information regarding the situation and the system's understanding of the situation. The multi modal data streams may also be input via direct inputs 210 from various sensors coupled to the computing device via various wired and/or wireless connections to video, audio, infrared, light, radio frequency (RF) and other sensors. Suitable computing device 120 may, for example, also include wireless local area network (WLAN) capability per IEEE specification 802.11b and/or other wired or wireless communications capabilities suitable for receiving multi modal data streams.

The computing device 120 may include a power button 204 and a user interface, such as one or more buttons 226 and/or display 202, such as a liquid crystal display (LCD), which may or may not be touch-sensitive, to serve as both a user input device and graphical output device.

The computing device 120 also includes one or more processors 218 and an associative memory 220 for implementing the associative memory module 106 as described herein, and optionally one or more other additional memory devices such as random access memory (RAM) 222, Read Only Memory (ROM) 212, flash memory and/or electronically erasable programmable read only memory (EEPROM), or other storage devices 214 (including one or more hard drives and/or optical disk drives) coupled by one or more system buses 224 to store data and instructions for execution by the processor 218 to implement the self-adaptive multi modal data stream processing system 102 described herein. For example, the instructions may be those of the multi modal data stream processing system 102 or individual components thereof that, when executed, perform the processes, routines and functions described herein. The computing device 120 may also include an interface driver 208 to couple user entries at the one or more buttons 224 or touch screen entries to the processor 218, and/or a display driver 206 to couple display data from the processor 218 to the display 202, such as to display output data regarding understanding by the system 102 of a situation as it unfolds over time.

For example, in one embodiment, the self-adaptive multi modal data stream processing system 102 can be implemented in the cyber domain, to facilitate timely detection and evaluation of malware and to dynamically optimize the deployment of countermeasures. Network attacks that are particularly difficult to mitigate can be comprised of multiple malware elements entering the network at different times and from different entry points. In such attack scenarios, each individual malware element can be harmless while their assembly can have a highly destructive impact on the network. Mitigating such attacks in real time requires selection and coordinated deployment of counter measures across the network in a manner that maximizes protection of network assets while causing minimal disruption in network services.

In one example situation, at the inception of an attack a valuable but vulnerable asset can be isolated from the network, in which case the asset is preserved but its function becomes unavailable for the duration of the isolation. Efficient selection and deployment of countermeasures is predicated on timely and reliable malware evaluation which includes a) using the already detected and/or suspected malware elements to predict the intended assemblies and b) assessing the degree of threat posed by the anticipated assemblies to various network assets. When employing the self-adaptive multi modal data stream processing system 102, the prediction process will be accounting for the composition of malware elements as well as the geospatial distribution of the sources, timing and the degree of correlation between the attack episodes. In the process, combinations of spatial, temporal and feature neurons (responding to different malware elements) represent different attack patterns and the ways those patterns can unfold in time and across the network. Attack predictions and response planning based on such patterns can be more expedient and reliable than when derived solely from malware composition.

A variety of techniques for attack detection and response optimization are known in the art (for example, Topological Vulnerability Analysis, etc.). In one embodiment, a process of the self-adaptive multi modal data stream processing system 102 (understanding-based cyber security, or UBCS) can be implemented independently or in conjunction with such analysis techniques, with the possibility of yielding radical improvements in the analysis outcome. According to one embodiment, implementing UBCS starts with defining and associating feature neurons and spatial neurons with sensors and geospatial locations in the cyber network, correspondingly. When applying UBCS, the neurons will be linked into a virtual network, with weights on the links determined by the relative frequency of neuron co-activation and/or other factors. When UBCS is used in conjunction with other techniques, the links and link weights in the virtual network can be derived from simulations and analysis involving sample attack scenarios. Alternatively, they can be derived from the actual history of the cyber network and/or supplied by analysts. Also, all three methods can be combined so that the initial values supplied by analysts get adjusted based on the simulation and analysis as well as the actual history.

Partitioning the virtual network into packets reveals correlation between malware elements, geospatial locations and temporal organization of attack patterns across a range of scenarios. Obtaining such correlations reduces evaluation uncertainty (e.g., a suspicious string is likely to be a malware element if arriving from servers in the area 1 and less likely so if arriving from server in the area 2) and improves prediction reliability (detecting some constituents of a packet predicts arrival of the other constituents) and expected response efficiency (e.g., reliable prediction enables preemptive countermeasures). As the information accumulates, the network re-partitions producing new packets and adjusting the previously formed ones. Energy barriers in the network provide a mechanism for optimizing network stability, that is, preventing both responding to insignificant changes in neuronal activation and ignoring the significant ones.

Complex and hyper complex neurons in the virtual hierarchy further improve evaluation of and response construction for attack patterns having complex temporal, spatial and feature organization. Semantic neurons can capture global relations in the cyber network and display them in a manner facilitating situational understanding by human analysts (e.g., attack is being mounted from servers in the Region A, with the assets x, y, z being the likely targets).

Figure 3:
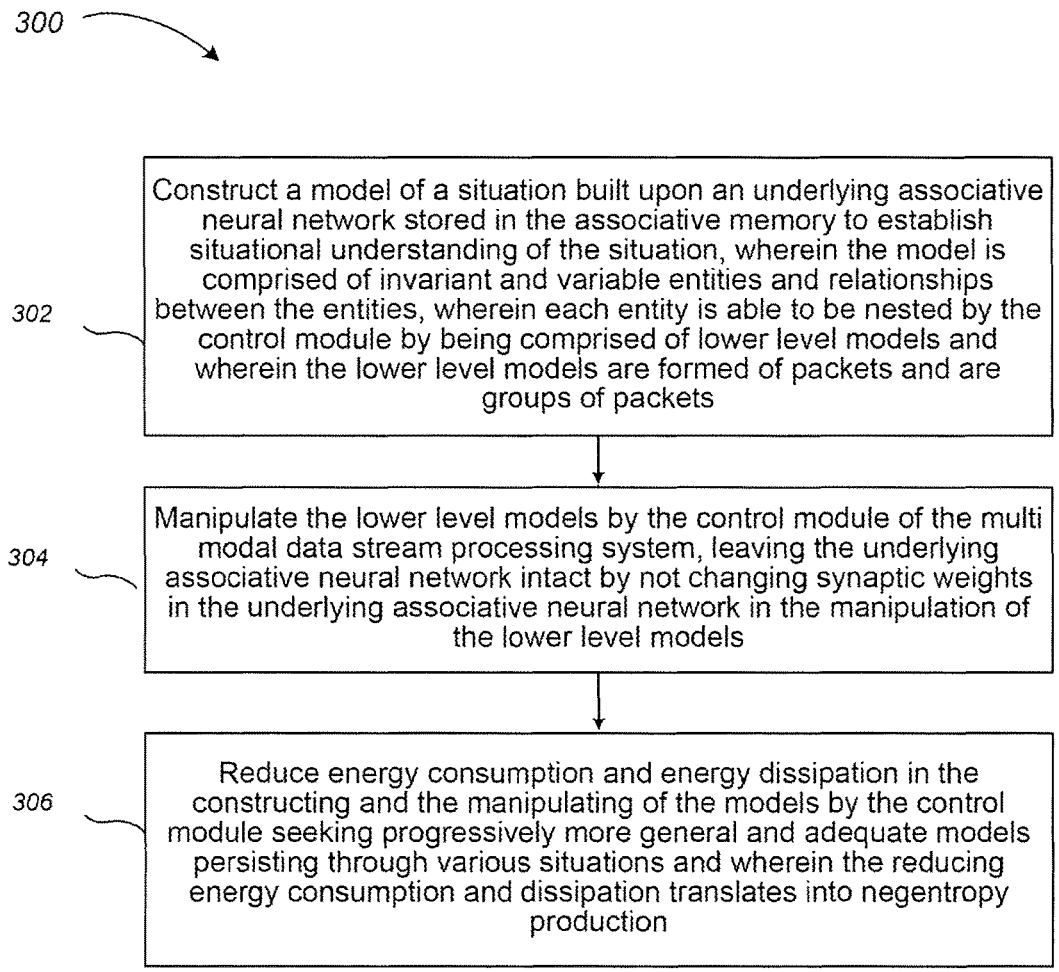
FIG. 3 is a flow diagram illustrating a process of the multi modal data stream processing system, according to one illustrated embodiment.

FIG. 3 is a flow diagram illustrating a process 300 of the multi modal data stream processing system 102, according to one illustrated embodiment.

At 302, the construction module 108 under control of control module 104 of the multi modal data stream processing system 102 constructs a model of a situation built upon an underlying associative neural network stored in the associative memory module 106 to establish situational understanding of the situation, wherein the model is comprised of invariant and variable entities and relationships between the entities, wherein each entity is able to be nested by the control module by being comprised of lower level models and wherein the lower level models are formed of packets and are groups of packets.

At 304, the control module 104 of the multi modal data stream processing system 102 manipulates the lower level models, leaving the underlying associative neural network intact by not changing synaptic weights in the underlying associative neural network in the manipulation of the lower level models.

At 306, the multi modal data stream processing system 102 reduces energy consumption and energy dissipation in the constructing and the manipulating of the models by the control module 104 seeking progressively more general and adequate models persisting through various situations and wherein the reducing energy consumption and dissipation translates into negentropy production.

Figure 4:
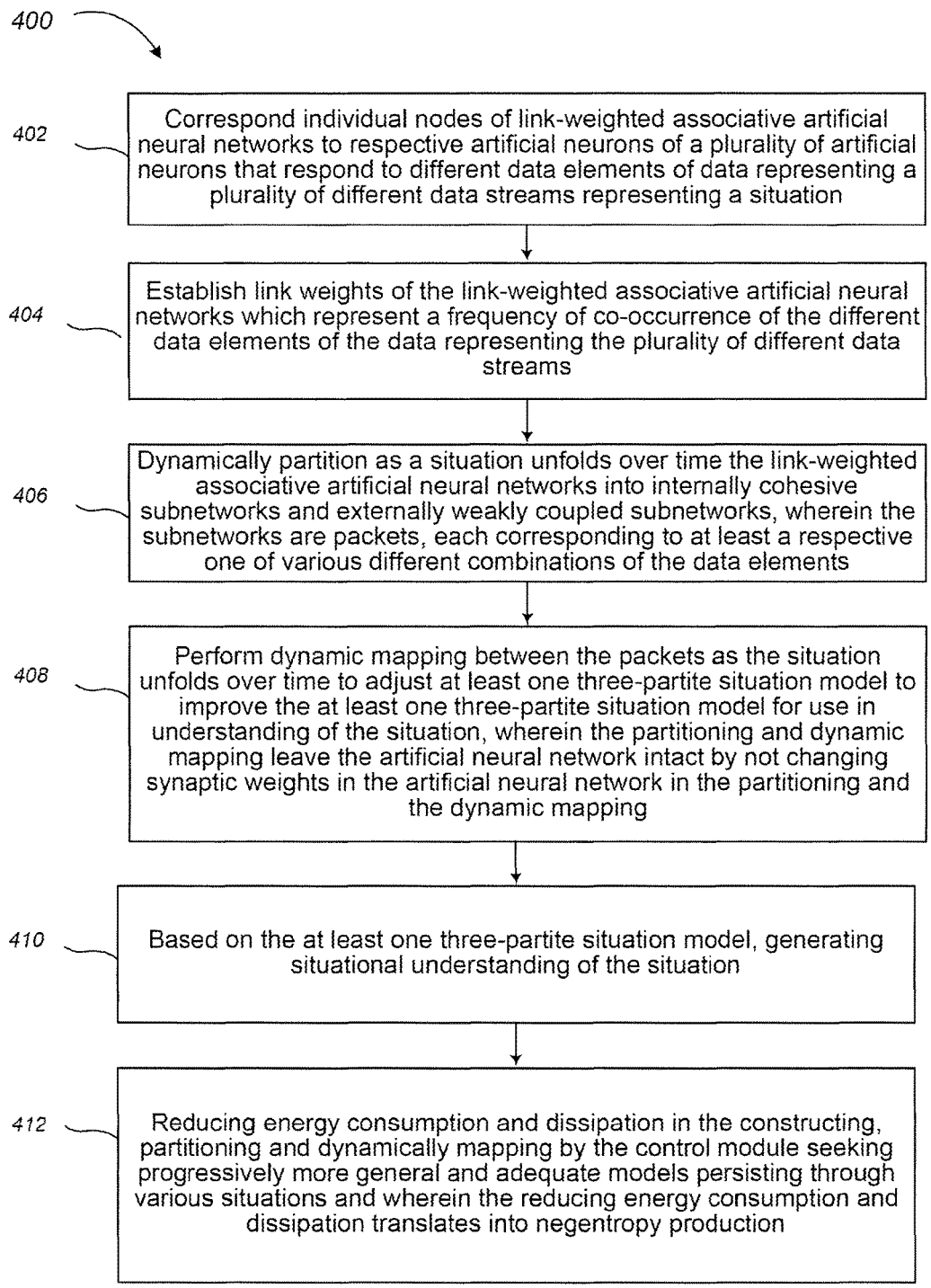
FIG. 4 is a flow diagram illustrating a process of the multi modal data stream processing system including details regarding how associative artificial neural networks of the system are developed, according to one illustrated embodiment.

FIG. 4 is a flow diagram illustrating a process 400 of the multi modal data stream processing system 102, including details regarding how associative artificial neural networks of the system are developed, according to one illustrated embodiment.

At 402, the construction module 108, under control of control module 104 of the multi modal data stream processing system 102, corresponds individual nodes of link-weighted associative artificial neural networks to respective artificial neurons of a plurality of artificial neurons that respond to different data elements of data representing a plurality of different data streams representing a situation.

At 404, the construction module 108 under control of control module 104 of the multi modal data stream processing system 102 establishes link weights of the link-weighted associative artificial neural networks which represent a frequency of co-occurrence of the different data elements of the data representing the plurality of different data streams.

At 406, the control module 104 of the multi modal data stream processing system 102 dynamically partitions, as a situation unfolds over time, the link-weighted associative artificial neural networks into internally cohesive subnetworks and externally weakly coupled subnetworks, wherein the subnetworks are packets, each corresponding to at least a respective one of various different combinations of the data elements.

At 408, the control module 104 of the multi modal data stream processing system 102 performs dynamic mapping between the packets as the situation unfolds over time to adjust at least one three-partite situation model to improve the at least one three-partite situation model for use in understanding of the situation, wherein the partitioning and dynamic mapping leave the artificial neural network intact by not changing synaptic weights in the artificial neural network in the partitioning and the dynamic mapping.

At 410, the multi modal data stream processing system 102, based on the at least one three-partite situation model, generates situational understanding of the situation.

At 412, the multi modal data stream processing system 102, reduces energy consumption and dissipation in the constructing, partitioning and dynamically mapping by the control module 104 seeking progressively more general and adequate models persisting through various situations and wherein the reducing energy consumption and dissipation translates into negentropy production.

Figure 5:
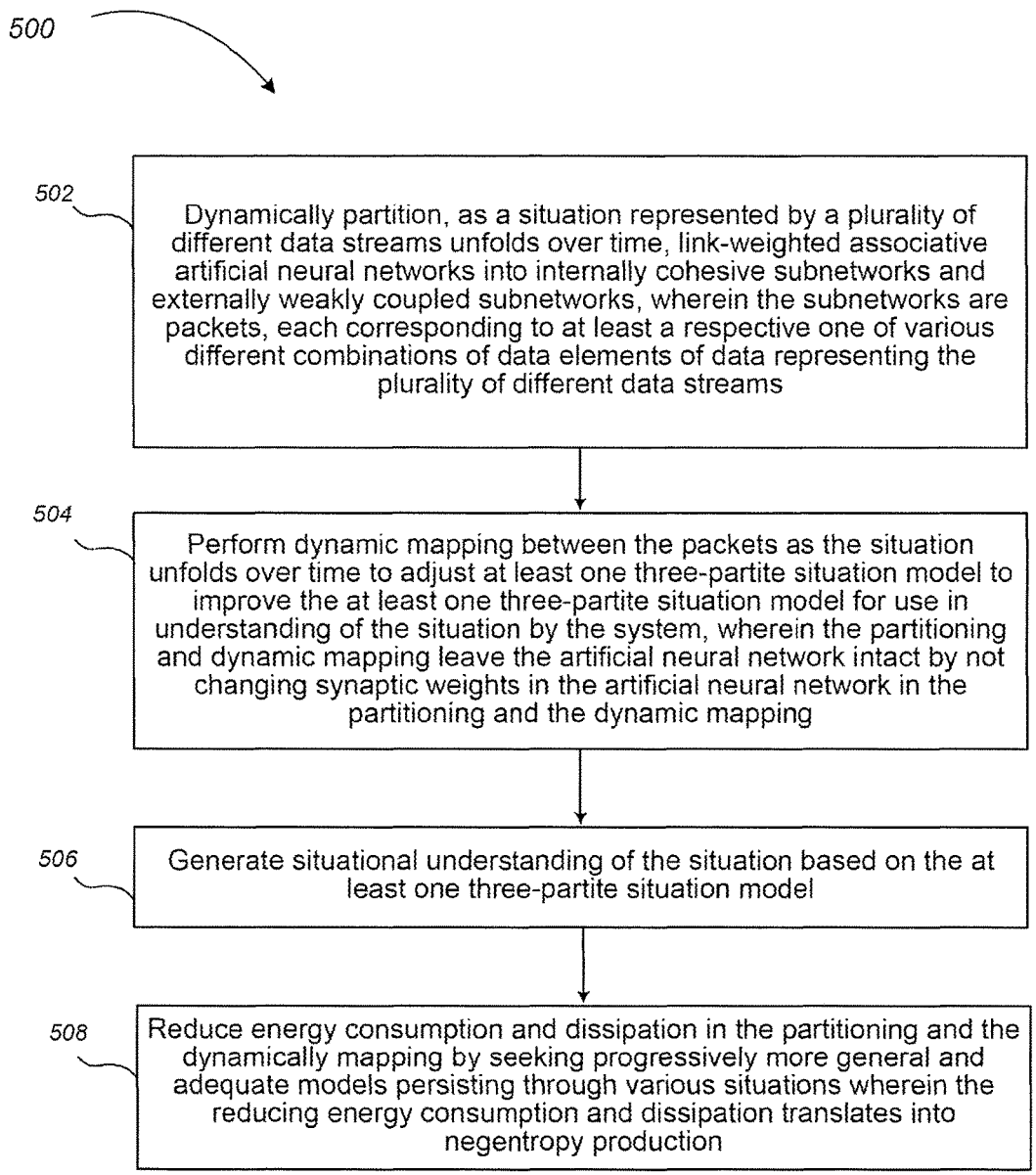
FIG. 5 is a flow diagram illustrating a process of the multi modal data stream processing system including details regarding dynamically partitioning link-weighted associative artificial neural networks of the system, according to one illustrated embodiment.

FIG. 5 is a flow diagram illustrating a process 500 of the multi modal data stream processing system 102 including details regarding dynamically partitioning link-weighted associative artificial neural networks of the system, according to one illustrated embodiment.

At 502, the control of control module 104 of the multi modal data stream processing system 102 dynamically partitions, as a situation represented by a plurality of different data streams unfolds over time, link-weighted associative artificial neural networks into internally cohesive subnetworks and externally weakly coupled subnetworks, wherein the subnetworks are packets, each corresponding to at least a respective one of various different combinations of data elements of data representing the plurality of different data streams.

At 504, the control module 104 of the multi modal data stream processing system 102 performs dynamic mapping between the packets as the situation unfolds over time to adjust at least one three-partite situation model to improve the at least one three-partite situation model for use in understanding of the situation by the system, wherein the partitioning and dynamic mapping leave the artificial neural network intact by not changing synaptic weights in the artificial neural network in the partitioning and the dynamic mapping.

At 506, the multi modal data stream processing system 102 generates situational understanding of the situation based on the at least one three-partite situation model.

At 508, the multi modal data stream processing system 102 reduces energy consumption and dissipation in the partitioning and the dynamically mapping by seeking progressively more general and adequate models persisting through various situations wherein the reducing energy consumption and dissipation translates into negentropy production.

Figure 6:
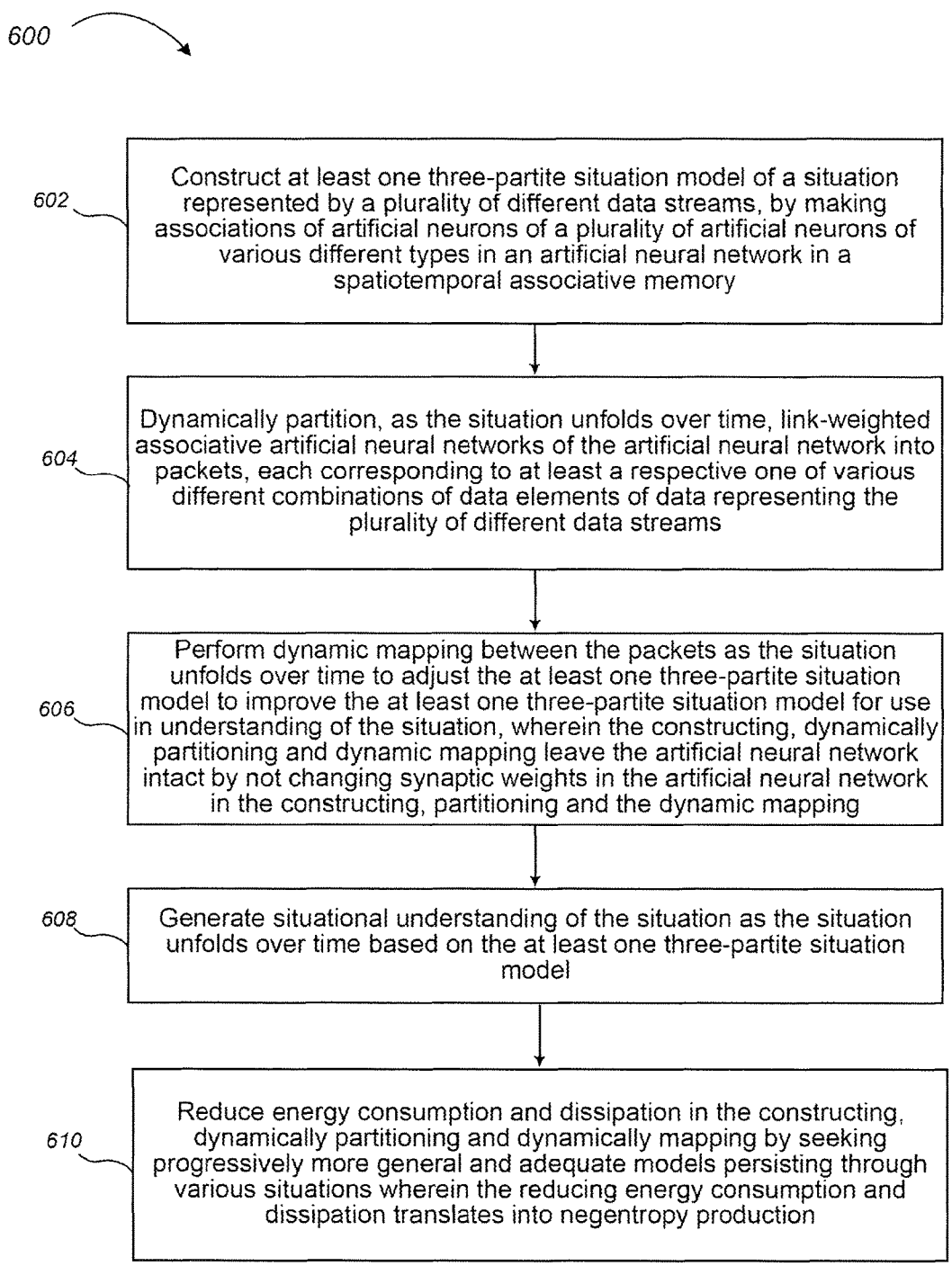
FIG. 6 is a flow diagram illustrating a process of the multi modal data stream processing system including details regarding improving a three-partite situation model of the system for use in understanding a situation represented by the model, according to one illustrated embodiment.

FIG. 6 is a flow diagram illustrating a process 600 of the multi modal data stream processing system 102 including details regarding improving a three-partite situation model of the system for use in understanding of a situation represented by the model, according to one illustrated embodiment.

At 602, the construction module 108, under control of the control module 104 of the multi modal data stream processing system 102, constructs at least one three-partite situation model of a situation represented by a plurality of different data streams by making associations of artificial neurons of a plurality of artificial neurons of various different types in an artificial neural network in a spatiotemporal associative memory.

At 604, the control module 104 of the multi modal data stream processing system 102 dynamically partitions, as the situation unfolds over time, link-weighted associative artificial neural networks of the artificial neural network into packets, each corresponding to at least a respective one of various different combinations of data elements of data representing the plurality of different data streams.

At 606, the control module 104 of the multi modal data stream processing system 102 performs dynamic mapping between the packets as the situation unfolds over time to adjust the at least one three-partite situation model to improve the at least one three-partite situation model for use in understanding of the situation, wherein the constructing, dynamically partitioning and dynamic mapping leave the artificial neural network intact by not changing synaptic weights in the artificial neural network in the constructing, partitioning and the dynamic mapping.

At 608, the multi modal data stream processing system 102 generates situational understanding of the situation as the situation unfolds over time based on the at least one three-partite situation model.

At 610, the multi modal data stream processing system 102 reduces energy consumption and dissipation in the constructing, dynamically partitioning and dynamically mapping by seeking progressively more general and adequate models persisting through various situations wherein the reducing energy consumption and dissipation translates into negentropy production.

Human understanding results from creating and manipulating mental models. In one embodiment, the self-adaptive multi modal data stream processing system 102, creation and manipulation involve "neuronal packets" formed in mutually constraining associative networks of four basic types as described above. The process of the self-adaptive multi modal data stream processing system 102 is thermodynamically driven, striving to produce a minimal number of maximally stable models. Obtaining such models is experienced by the system 102 as grasping, or understanding the input stream (objects, their relations and the flow of changes).

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as hard disk drives, DVD ROMs, solid state drives, flash memory drives, associative memory and other computer memory.

The various embodiments described above can be combined to provide further embodiments. Aspects of the embodiments can be modified, if necessary, to employ systems, circuits and concepts to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method in a self-adaptive multi modal data stream processing system having at least one computer processor, the computer processor including a control module that establishes a system of "artificial neurons" and associates data elements and various combinations of data elements with said neurons, a construction module under control of the control module that constructs components of situation models, and at least one spatiotemporal associative memory coupled to the at least one computer processor, the method comprising:

receiving multi modal data streams by the computer processor from multiple data stream sources, the multi modal data streams representing an environment of the multi modal data stream processing system;

constructing, by the construction module, at least one three-partite situation model of a situation, by making associations of artificial neurons of a plurality of artificial neurons of various types in an artificial neural network in the at least on spatiotemporal associative memory, wherein the three-partite situation model represents at least two entities and a relation between the at least two entities or at least two states of the same entity and a relation between the at least two states, wherein the step of constructing of the at least one three-partite situation model includes:

developing, by the control module, link-weighted associative artificial neural networks in the spatiotemporal associative memory, wherein the step of developing the link-weighted associative artificial neural networks includes:

corresponding, by the multi modal data stream processing system, individual nodes of the link-weighted associative artificial neural networks to respective artificial neurons of the plurality of artificial neurons that respond to different data elements of data representing the plurality of different data streams representing a situation; and establishing link weights of the link-weighted associative artificial neural networks which represent a frequency of co-occurrence of the different data elements of the data representing the plurality of different data streams;

dynamically partitioning as the situation unfolds over time, by the control module, the link-weighted associative artificial neural networks into internally cohesive subnetworks and externally weakly coupled subnetworks and placing energy barriers at a subnetwork boundary of each of the subnetworks, with the barrier height computed as a function of the weights of the links inside the subnetwork and weights of the links connecting the subnetwork to its surrounds, wherein the subnetworks are neuronal packets, each corresponding to at least a respective one of various different combinations of the data elements;

performing dynamic mapping, by the control module, between the neuronal packets as the situation unfolds over time to adjust the at least one three-partite situation model to improve the at least one three-partite situation model for use in understanding of the situation, wherein the partitioning and dynamic mapping leave the artificial neural network intact by not changing synaptic weights in the artificial neural network in the partitioning and the dynamic mapping;

based on the at least one three-partite situation model, generating, by the multi modal data stream processing system, situational understanding of the situation;

reducing, by the multi modal data stream processing system, energy consumption and dissipation accompanying neuronal packet adjustments in the constructing, partitioning and dynamically mapping by the control module seeking progressively more general and adequate models persisting through various situations and wherein the reducing energy consumption and dissipation translates into negentropy production; and based on a generated situational understanding of a situation, generating in real time by the multi modal data stream processing system appropriate output to facilitate one or more responses to the situation selected from the group consisting of an assessed threat level when objects or conditions in the situation constitute a threat when acting in coordination, identification of objects in an environment of a robotic vehicle or other robotic system, automatic detection and evaluation of malware in a computer network, and a disturbance in a reactor system;

if the situation is an assessed threat level, facilitating an automated intelligent surveillance of the situation;

if the situation is objects in an environment of a robotic vehicle or other robotic system, performing by the robotic vehicle or other robotic system adjusting pursuit of specified objectives and responding to obstacles; and if the situation is the automatic detection and evaluation of malware in a computer network, dynamically deploying countermeasures against the malware over time, if the situation is the disturbance in the reactor system, dynamically maintaining performance within user-defined safety or production limits for the reactor system, wherein the plurality of artificial neurons of various different types includes a combination of: sensory neurons, temporal neurons, feature neurons, spatial neurons, complex neurons, hyper complex neurons, and semantic neurons wherein the sensory neurons respond to different elements (features) in the incoming streams, the temporal neurons respond to various temporal relations in the activation of sensory neurons, the spatial neurons respond to different locations and relative positions of activation sources, the complex neurons respond to various activation patterns involving sensory, temporal and spatial neurons, the hyper complex neurons respond to various compositions of activation patterns involving complex neurons, and the semantic neurons respond to various patterns of activation involving hyper complex neurons and associate such patterns with labels in a finite set of labels defined by a user to signify meaningful relationships, wherein the dynamic mapping includes manipulating packets by the control module, wherein the manipulating includes applying an operation of enfolding to packets comprising:

associating a neuronal pool with N-dimensional space of N dimensions (P-space), with each of the N dimensions corresponding to a particular data element type contained within a sensitivity range, which is a response vector, of one or more neurons in the neuronal pool;

in the packets, replacing a multitude of response vectors of constituent neurons by a single vector (PR-vector) computed as a function of constituent response vectors;

representing changes in packet composition and characteristics as movement of PR-vectors in P-space;

defining feature neurons by specifying points or regions in P-space residing within a sensitivity range of each feature neuron;

defining temporal neurons by specifying ordering relations in the movement of two or more PR-vectors;

defining spatial neurons by specifying configurations of points or regions in P-space subject to simultaneous traversal by two or more PR-vectors;

defining complex neurons by specifying coordinated movement of two or more PR-vectors in P-space;

defining hyper complex neurons by specifying coordinated movement of two or more PR-vectors produced by packets comprised of complex neurons;

defining semantic neurons by specifying coordinated movement of PR-vectors produced by nested packet structures comprised of hyper complex, complex and other types of neurons;

using distance between PR-vectors in P-space as a measure of packet discriminability;

representing external entities, which are sources of multi modal sensory streams received by the neuronal pool, as nested packet structures and associating behavior of such entities with the movement of PR-vectors associated with such structures;

defining a relationship between external entities A and B by specifying a form of coordination between the movement of corresponding PR-vectors;

defining two-partite situation models by specifying two external entities and a relationship between them;

defining three-partite situation models by specifying two entities A and B and specifying a third entity C such that a PR-vector associated with C moves between PR-vectors associated with A and B;

defining variable and invariant components of situation models by specifying varying and fixed components of constituent PR-vectors; and deriving a likely future and past changes in the situation from trajectories of PR-vectors in P-space obtained by the control module via manipulating packet structures comprised in the situation model.

2. The method of claim 1 wherein the changes represented result from varying packet responses by the control module.

3. The method of claim 1 wherein defining feature neurons includes defining that a feature neuron fires when a particular point or region in P-space is traversed by a PR-vector of a packet comprised of sensory neurons.

4. The method of claim 1 wherein the defining temporal neurons includes defining that a temporal neuron fires when a particular region in P-space is traversed by a particular PR-vector followed by one or more other PR-vectors.

5. The method of claim 1 wherein the simultaneous traversal occurs within a certain time window.

6. The method of claim 1 wherein the defining spatial neurons includes defining that a spatial neuron fires when points two points or regions in P-space are simultaneously traversed by two respective PR-vectors.

7. The method of claim 1 wherein the defining complex neurons includes defining that a complex neuron X fires when PR-vector A and PR-vector B remain equidistant in P-space within some time interval ??, that complex neuron Y fires when PR-vector A revolves around PR-vector B, and that complex neuron Z fires when PR-vector A moves toward PR-vector B.

8. The method of claim 1 wherein the defining hyper complex neurons includes defining that hyper complex neuron X fires when firing of complex neuron Y is followed by firing of complex neuron Z such that Y responds to particular PR-vectors A and B moving towards each other while neuron Z responds to the particular PR-vectors moving away from each other).

9. The method of claim 1 wherein the movement of PR-vectors is movement of terminal points.

10. The method of claim 1 wherein the measure of packet discriminability is a probability of confusion.

11. The method of claim 10 wherein the probability of confusion includes is based on one or more scenarios in which PR-vector A is proximal to PR-vector B in which A and B are determined likely to be confused, or in which PR-vector C is distant from PR-vector B in which confusion is determined to be unlikely.

12. The method of claim 1 wherein the PR-vector associated with entity C moves by oscillating between the PR-vectors associated with the specified entities A and B.

13. The method of claim 1 wherein the varying and fixed components of the constituent PR-vectors are projections of each of the PR-vector onto one or more axes in the N-dimensional P-space.

14. The method of claim 1 wherein the deriving the likely future and past changes in the situation is prediction and retrodiction, respectively.

15. A computer implemented method in a self-adaptive multi modal data stream processing system having at least one computer processor and at least one spatiotemporal associative memory coupled to the at least one computer processor, the method comprising:
receiving multi modal data streams by the computer processor from multiple data stream sources, the multi modal data streams representing an environment of the multi modal data stream processing system;
constructing, by a construction module under control of a control module of the multi modal data stream processing system, a model of a situation built upon an underlying associative neural network that is partitioned into neuronal packets which are internally cohesive and externally weakly coupled subnetworks surrounded by energy barriers at a boundary of the subnetworks;
storing the underlying associative neural network in the associative memory to establish situational understanding of the situation;
associating neuronal packet groupings into stable (invariant) and changing (variable) entities and relationships between the entities;
assigning a relationship type to the components based on their content and behavior thereby creating a model of the situation, wherein each entity is able to be nested by the control module by being comprised of lower level models and wherein the lower level models are formed of neuronal packets and are groups of neuronal packets;
manipulating the lower level models by the control module of the multi modal data stream processing system, by manipulating neuronal packets while leaving the underlying associative neural network intact by not changing synaptic weights in the underlying associative neural network in the manipulation of the lower level models;
reducing, by the multi modal data stream processing system, energy consumption and energy dissipation in the constructing and the manipulating of the models by the control module seeking progressively more general and adequate models persisting through various situations and wherein the reducing energy consumption and dissipation translates into entropy reduction, or system negentropy production in the system;
based on a generated situational understanding of a situation, generating in real time by the multi modal data stream processing system appropriate output to facilitate one or more responses to the situation selected from the group consisting of an assessed threat level when objects or conditions in the situation constitute a threat when acting in coordination, identification of objects in an environment of a robotic vehicle or other robotic system, automatic detection and evaluation of malware in a computer network, and a disturbance in a reactor system;
if the situation is an assessed threat level, facilitating an automated intelligent surveillance of the situation;
if the situation is objects in an environment of a robotic vehicle or other robotic system, performing by the robotic vehicle or other robotic system adjusting pursuit of specified objectives and responding to obstacles; and
if the situation is the automatic detection and evaluation of malware in a computer network, dynamically deploying countermeasures against the malware over time,
if the situation is the disturbance in the reactor system, dynamically maintaining performance within user-defined safety or production limits for the reactor system,
wherein the plurality of artificial neurons of various different types includes a combination of: sensory neurons, temporal neurons, feature neurons, spatial neurons, complex neurons, hyper complex neurons, and semantic neurons wherein the sensory neurons respond to different elements (features) in the incoming streams, the temporal neurons respond to various temporal relations in the activation of sensory neurons, the spatial neurons respond to different locations and relative positions of activation sources, the complex neurons respond to various activation patterns involving sensory, temporal and spatial neurons, the hyper complex neurons respond to various compositions of activation patterns involving complex neurons, and the semantic neurons respond to various patterns of activation involving hyper complex neurons and associate such patterns with labels in a finite set of labels defined by a user to signify meaningful relationships,
wherein the dynamic mapping includes manipulating packets by the control module, wherein the manipulating includes applying an operation of enfolding to packets comprising:
associating a neuronal pool with N-dimensional space of N dimensions (P-space), with each of the N dimensions corresponding to a particular data element type contained within a sensitivity range, which is a response vector, of one or more neurons in the neuronal pool;
in the packets, replacing a multitude of response vectors of constituent neurons by a single vector (PR-vector) computed as a function of constituent response vectors;
representing changes in packet composition and characteristics as movement of PR-vectors in P-space;

defining feature neurons by specifying points or regions in P-space residing within a sensitivity range of each feature neuron;

defining temporal neurons by specifying ordering relations in the movement of two or more PR-vectors;

defining spatial neurons by specifying configurations of points or regions in P-space subject to simultaneous traversal by two or more PR-vectors;

defining complex neurons by specifying coordinated movement of two or more PR-vectors in P-space;

defining hyper complex neurons by specifying coordinated movement of two or more PR-vectors produced by packets comprised of complex neurons;

defining semantic neurons by specifying coordinated movement of PR-vectors produced by nested packet structures comprised of hyper complex, complex and other types of neurons;

using distance between PR-vectors in P-space as a measure of packet discriminability;

representing external entities, which are sources of multi modal sensory streams received by the neuronal pool, as nested packet structures and associating behavior of such entities with the movement of PR-vectors associated with such structures;

defining a relationship between external entities A and B by specifying a form of coordination between the movement of corresponding PR-vectors;

defining two-partite situation models by specifying two external entities and a relationship between them;

defining three-partite situation models by specifying two entities A and B and specifying a third entity C such that a PR-vector associated with C moves between PR-vectors associated with A and B;

defining variable and invariant components of situation models by specifying varying and fixed components of constituent PR-vectors; and deriving a likely future and past changes in the situation from trajectories of PR-vectors in P-space obtained by the control module via manipulating packet structures comprised in the situation model.

* * * * *